Figures 1, 9, 10:
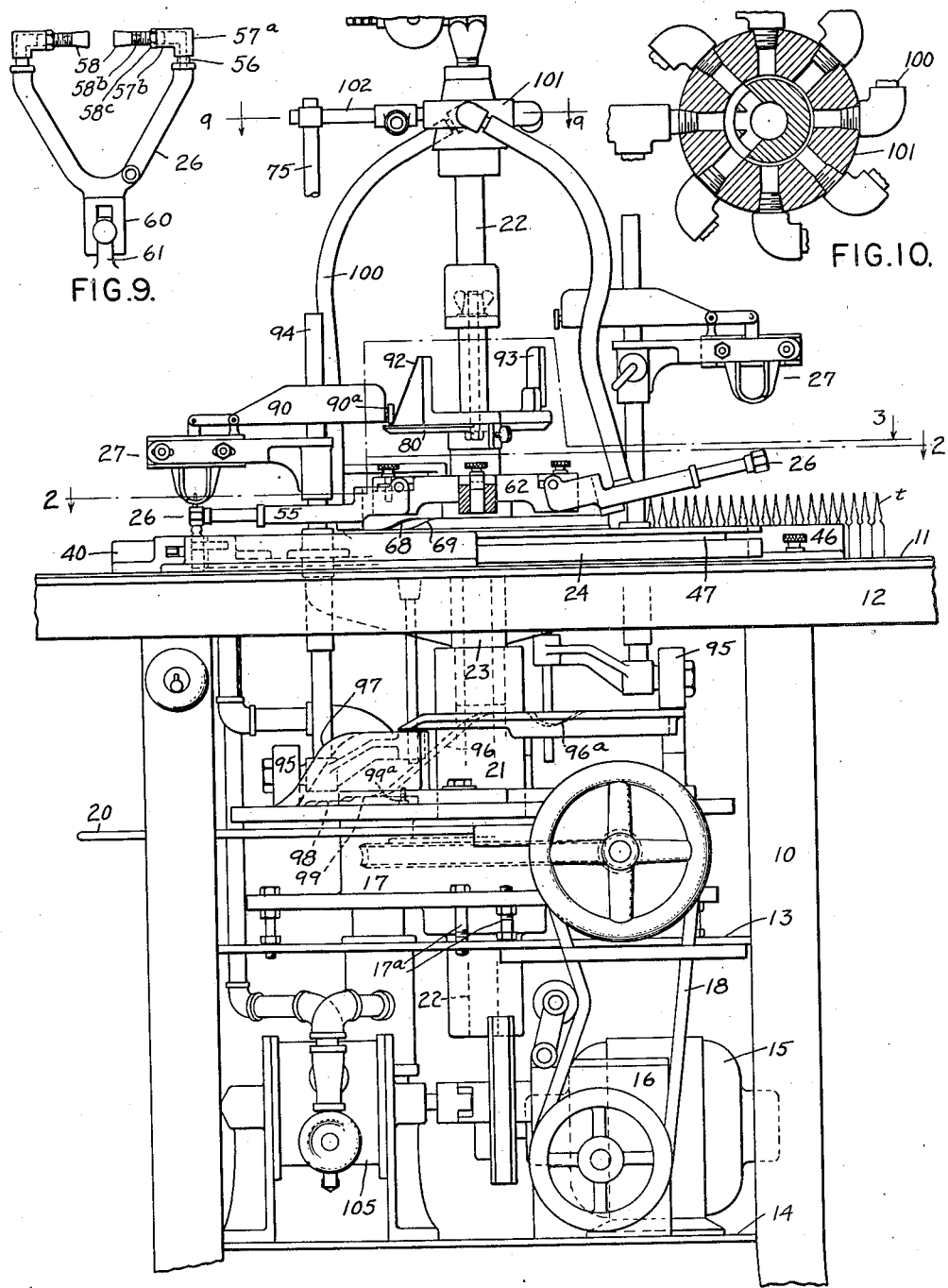

March 14, 1950 F. J. COZZOLI 2,500,521
SEALING MACHINE
Filed March 22, 1946 3 Sheets-Sheet 1

INVENTOR
Frank J. Cozzoli
BY
Harold F. Scribner
ATTORNEY

March 14, 1950    F. J. COZZOLI    2,500,521
SEALING MACHINE
Filed March 22, 1946    3 Sheets-Sheet 2
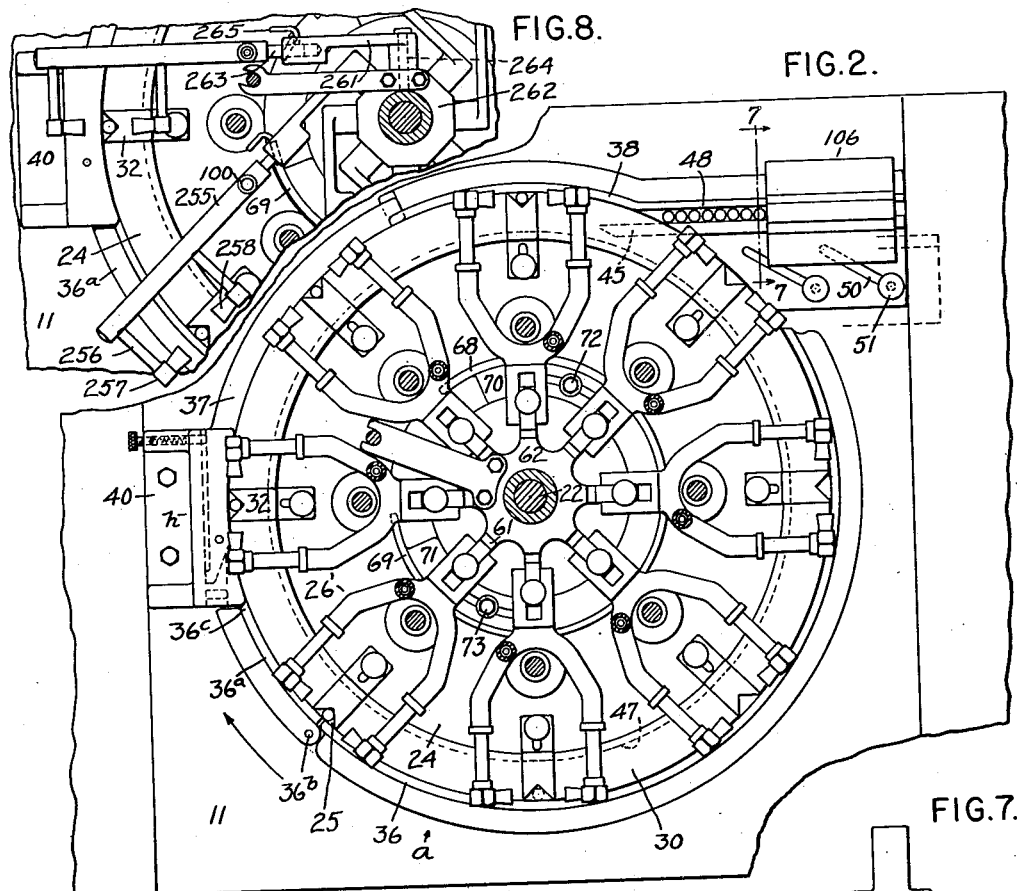
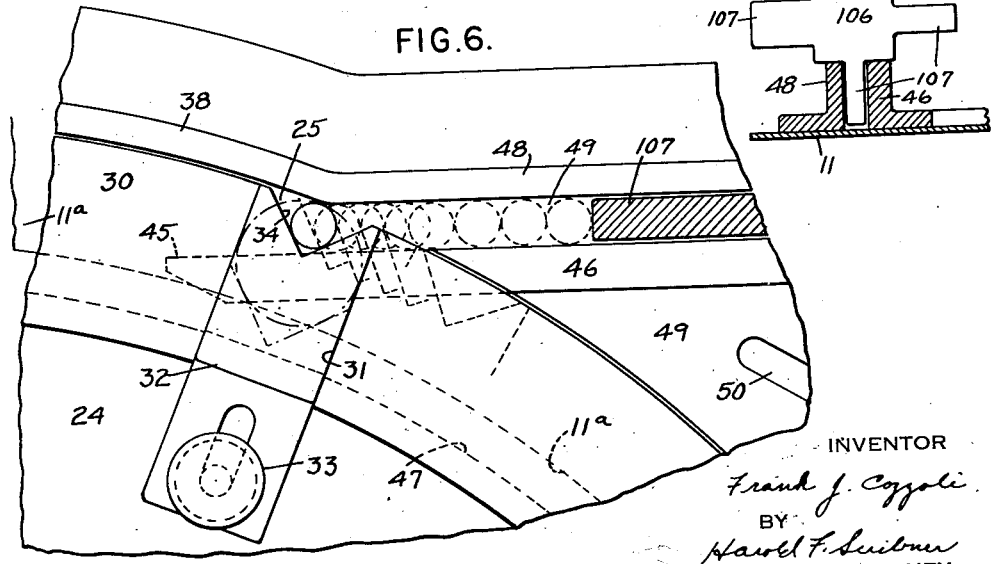
INVENTOR
Frank J. Cozzoli
BY
Harold F. Scribner
ATTORNEY March 14, 1950     F. J. COZZOLI     2,500,521
SEALING MACHINE
Filed March 22, 1946     3 Sheets-Sheet 3
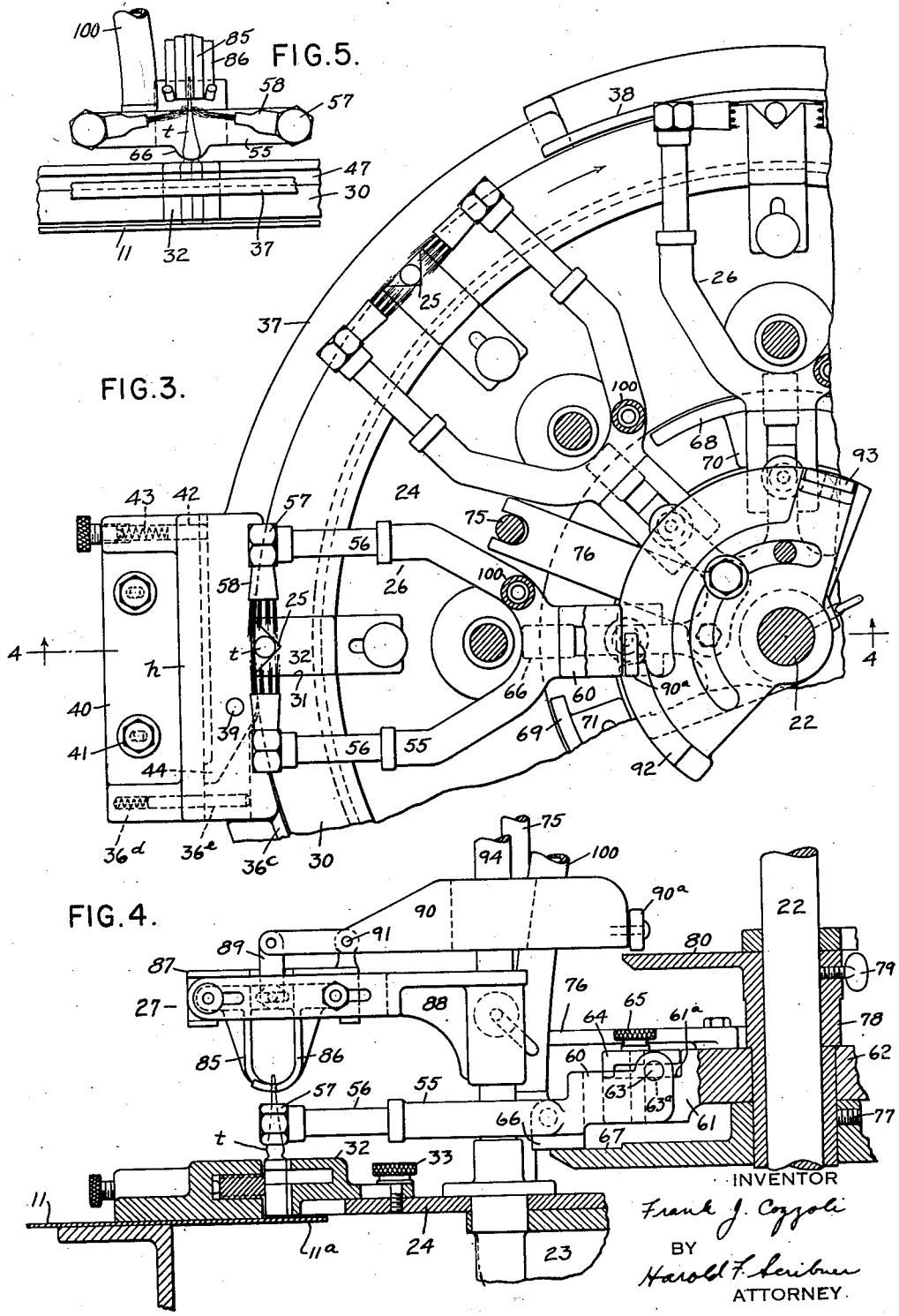
INVENTOR
Frank J. Cozzoli
BY
Harold F. Scribner
ATTORNEY Patented Mar. 14, 1950

2,500,521

UNITED STATES PATENT OFFICE 2,500,521

SEALING MACHINE

Frank J. Cozzoli, Plainfield, N. J.

Application March 22, 1946, Serial No. 656,388

1 Claim. (Cl. 49—7)

This invention relates to the art of sealing glass tubes by fusion and more particularly to a machine for sealing glass tubes and ampules automatically. The invention has for a primary objective to shorten the heating and sealing period so as to avoid the tendency of the packaged product to heat up during the tube sealing operation and to effect strong and uniform seals in a rapid efficient manner.

Another aim of the invention is to render available an improved tube-supporting and tube-transporting mechanism for holding and moving the tubes to be processed from one place to another, as for example from the loading station of a sealing machine, through the sealing stages, and finally to a discharge station, and to effect the discharge automatically. By way of further improvement, the invention undertakes to provide a tube transporting mechanism with the capacity for adjustment for tube or ampule size and to render available an efficient sealing machine embodying a minimum number of elements but capable of handling a relatively wide range of sizes of tubes.

In some respects the machine of the present invention is similar to the machines disclosed in my prior Patents #2,258,408 and #2,379,343, but is essentially different therefrom in respects to the method of sealing performed and in respects to the structure and coaction of the elements designed to carry out this improved method.

The herein proposed method of sealing applies more especially to the sealing of suture tubes or other straight walled tubes and includes gripping a tube at its upper and lower ends and then enveloping the tube, at the region where the seal is to be made, with upwardly directed heat adequate to soften the glass. When the glass begins to soften, the tube ends are stretched a slight distance apart. This initial stretching breaks the surface tension in the glass and produces a partial constricting or reduction in tube diameter. After an interval of rest, in its partially stretched state and with the heat still applied, the tube is given a further slight stretch, which again reduces the diameter at the heated zone and partially seals the tube. The tube is again held in its secondary stretched state until the envelope of flame closes in the side walls and starts to form a seal. At this stage of the operation, the gripped ends of the tube are quickly moved apart while heat remains applied to the tip of the tube to finish off the seal. As applied to the sealing of ampules or other already constricted tubes, the above mentioned double preliminary stretching steps may, if desired, be omitted without unfavorable results. During the sealing operation the tube is heated, on at least two opposite sides, by a multi-flame burner, the flames from which are directed toward the tube axis and somewhat away from the filled portion thereof and substantially completely envelopes the tube on all sides. A tube heated in this manner becomes uniformly heated and the need for rotating, heretofore regarded as necessary, is not required, effecting not only a saving in mechanism and sealing time, but with an improvement in the character of the seal. With the present arrangement of crossfire burners no portion of the heated part of the tube is chilled by moving away from or out of the flame as is the case in rotating a tube.

During the sealing cycle above mentioned, the tube travels from a loading station adjacent the operator to a discharge station where it is automatically ejected. Meanwhile, additional tubes are being loaded in the continuously traveling receptacles and each, in succession, undergoes the same treatment.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 1 is a front view of a sealing machine embodying this invention. Fig. 2 is a plan view of the machine, taken substantially along line 2—2 of Fig. 1. Fig. 3 is an enlarged plan view, taken substantially along line 2—3 of Fig. 1, showing a segment of the table at the sealing zone. Fig. 4 is a vertical sectional view taken along line 4—4 of Fig. 3. Fig. 5 is a front view of one of the burners. Fig. 6 is an enlarged plan view of the table at the discharge station. Fig. 7 is a vertical sectional view of the discharge channel showing a tube back-up block in operating position. Fig. 8 is a plan view of a portion of a machine equipped with a variant form of crossfire burner. Fig 9 is a detail view of a crossfire burner assembly having means to vary the gap between the burner tips. Fig. 10 is a horizontal sectional view, taken along line 9—9 of Fig. 1, showing a preferred form of distributor cone valve arrangement.

Referring more particularly to Fig. 1 of the drawings, the invention is illustrated as embodied in a machine having a main frame 10 provided with a table top 11 that rests upon horizontal rails 12. Shelves 13 and 14 secured to the legs of the frame 10, support the machine's driving mechanism which includes a motor 15, a speed reducing unit 16 driven thereby, and a second speed reducing unit 17 that is driven from the unit 16 by means of a stepped pulley drive 18. The reduction unit 17 is adapted to be driven from the belt and pulley means 18 through a disc clutch (not shown) that is controlled by a hand lever 20. The worm gear of the reducing unit 17 is provided with an extended hub 21 that provides a support for a rotatable turret 23. A non-rotatable centrally located shaft 22 extends upwardly through the members.

The turret 23 has secured thereto a table 24 that is equipped with a plurality of tube holding and transporting receptacles 25 (eight being illustrated in the instant machine), as well as eight burner units 26, and eight upper grippers 27, all of which are adapted to be rotated in synchronism.

Referring more particularly to Figs. 2–4, the rotatable table 24 is provided with a thickened peripheral rim 30 that has eight radial slots 31 formed therein and in which radially adjustable V-blocks 32 are mounted. The respective V-blocks normally are clamped, by clamp screws 33, in such positions that the outer periphery of a tube $t$ inserted between the V-walls 34 of the block, extends slightly beyond the outer peripheral circle of the rim 30 of the table 24. The V-blocks, it will be seen, form two vertical walls of a tube receptacle, and the third and outer vertical wall is formed by the inside surfaces 35 of non-rotatable ring sections 36, 36a, 37, and 38.

The bottoms of the tube receptacles are, in accordance with this invention, formed by an inwardly extending portion 11a of the table top 11. The portion 11a, as shown more clearly in Fig. 4, underlies the triangular tube receptacles in the rotatable table 24 and forms a non-rotating, endless annular track upon which the tubes rest as they are carried along by the V-blocks. The reducing unit 17, as a whole, and the hub 21, turret 23 and table 24 carried thereby is designed for vertical adjustment, as by means of adjusting screws 17a that engage the shelf 13, for the purpose of increasing or decreasing the space between the table 24 and the track 11a. Any chips of glass that may fall into the receptacles, tend to be wiped off the tube track, as the tubes move along, and excessive wear and abrading away of the elements is, by this arrangement, avoided.

As illustrated in Figs. 3 and 6, the ring sections 36 and 38 are spaced a slight distance away from the periphery of the table 24 and do not press tightly upon the sides of the tubes. The section 36a, however, is preferably pivoted at its leading end 36b to the stationary table 11, and its trailing end 36c is spring urged toward the table rim. A spring 36d seated in a recess in the block 40 operates against one end of a plunger 36e whose other end engages a thickened portion of the free end of the guide 36a. By this means the tubes are successively pressed against the walls of the V-shaped openings after they leave the loading station, and are held upright and steady as they pass into the heating zone $h$. At the heating zone the tubes are urged more firmly into their respective V-openings, and for that purpose the ring section 37 is constructed to be yieldingly urged against the tubes as the latter are carried along.

Referring to Fig. 3, the ring section 37 is in the form of an arcuate lever which is pivoted at 39 in a radially adjustable block 40 that is held normally in fixed position by clamp screws 41. A plunger 42, movable in a recess formed in the block 40, and urged by a compression spring 43, engages the section 37 at one side of its pivot and presses the free end of the lever against the sides of the tubes held in the V-openings in the table. The extent of movement of the lever 37 inwardly may be limited by an abutment 44 formed thereon. The action and function of the yieldable section 37 is to press the tubes rather firmly into their respective V-block supports during the time the tubes are being stretched in the course of the sealing operation, as will later be described. As the tubes leave the sealing zone and reach the ring section 38, they are again loosely supported in their receptacles and carried by the traveling V-blocks to the discharge station, illustrated in the upper right corner of Fig. 2, and by Fig. 6.

As the tubes arrive at the discharge station, a relatively stationary finger 45, which forms part of a guiding wall member 46, is reached and engaged by the tubes. The finger 45 extends laterally into a peripheral slot 47 formed in the rim of the table 24 and also in the V-blocks 32, and makes an angle of approximately 112½° to a line radially of the table. A portion 48 of the ring section 38 extends tangentially from the rotary table and is arranged parallel to the member 46, and the two members together, form a passage way 49 leading away from the periphery of the rotary table. The tongue member 46 is formed with a relatively wide bottom flange 49 which is slotted as at 50 to receive clamp screws 51. The slots 50 extend at an acute angle to the passageway 49, so as to effect a withdrawal of the finger 45 as the passageway is widened to accommodate larger sizes of sealed tubes.

In order to prevent the tubes from falling over after being ejected at the discharge station, especially round bottom tubes, a block member is slidably mounted in the discharge channel 49. Any suitable block may be used, but a preferred form comprises a star-shaped block 106, having a plurality of lateral fins 107 of different thicknesses to suit different channel widths. The core of the block is adapted to rest upon the tops of the flanges 48 and 46, with one of the fins 107 projecting into the channel. As tubes are moved outwardly by the combined action of the discharge finger 45 and the angularly moving and slanted walls of the tube receptacles, the block 60 is caused to slide outwardly by the pressure of the tubes thereagainst. The weight of the block holds the tubes ahead of it in upright position for a sufficient length of time to permit the sealed ends to cool, after which the tubes may be readily handled.

This invention proposes an improved method of sealing a tube, which includes the conveyor mechanism above explained whereby the successive tubes are nonrotatively carried, and the multiple flame burner units 26. As the eight burner units of the machine are identical, a description of one and its operational cycle is deemed sufficient, it being understood that each of the others performs in a similar manner in sequence. Figs. 3 and 4 illustrate the burner units 26 on an enlarged scale, and each comprises a centrally cored two-armed burner member 55 which is threaded at its outer ends to receive extension nipples 56. At the outer end of each of the nipples 56, a burner head 57 is mounted which receives a burner tip 58. As illustrated in Fig. 5, the burner heads 57 and tips 58 of each burner unit, are positioned such that the flames do not directly oppose each other but are directed upwardly, along the axis of the tube. This upward directed flame reduces the extent that the heat will flow downwardly (toward the tube's contents), and the crossfire of each of the pair tends to heat the other less.

Moreover, in carrying forward one of the aims of this invention, to wit, that of effecting a strong and uniform seal on the tubes, each burner tip 58, is constructed to produce longer flames at its outer edges than at the central portions, as illustrated in Fig. 3. When the burners are brought into position to heat a round tube, the shorter flames heat the circumference of the tube nearest the burner tip whereas the longer flames reach around the sides of the tube as shown in Fig. 3. With but two opposed burners of this character, each tube becomes adequately heated throughout its circumference to promote the formation of a strong seal.

It will be understood that each burner unit and its multiple jet flame, moves with the table 24 in phase with each tube receptacle, and at certain zones in its travel, is sequentially raised and lowered. To that end, each burner unit is provided with a bifurcated extension 60 that straddles one of the arms 61 of a revolvable spider 62. Each of the burner extensions 60 has a radially adjustable pivotal connection with its associated arm 61. The pivotal connection comprises a pin 63 that passes through both arms of the extension 60 and has a medially flattened portion 63a that overlays a recessed portion 61a of the spider arm. An L-shaped clamp member 64 overlays the flattened region of the pivot pin 63, and by means of a clamp screw 65 threaded into the arm 61, provides a convenient means for clamping the burner arm pivot in a selected radial position. Due to the fact that the outer peripheries of the tubes to be sealed, regardless of their size, are substantially tangent to the outer circle of the table 24, their respective centers shift inwardly as the tube sizes increase, hence the burner tips must move inwardly to position their flames substantially across the diameter of the tube. By releasing the clamp screws 65, the burner pivots may be radially adjusted the required amount, and then reclamped. A further purpose and function of the pivotal connection 63 is to provide a hinge point about which the burner tips 58 may rock, from a tube heating position such as illustrated at the left in Fig. 1, to an ineffective position such as illustrated at the right in Fig. 1.

To effect such raising and lowering of the burner arm assemblies, each burner unit is formed with a cam lobe 66 on its under side that is adapted to rest upon a relatively stationary cam plate 67 when the burner is down in tube heating position. A burner raising cam 68 and a burner lowering cam 69 (Figs. 1 and 2) are also mounted upon the cam plate 67, in proper angularly adjusted positions, to effect a lowering of the burner to sealing position after its associated tube receptacle is provided with a tube, and to effect a raising of the burner on completion of the heating and sealing operation. The cams overlap one another (as in Patent #2,379,343) and each cam is angularly adjustable on the cam plate 67 so that the point of lowering and raising of the burners and the duration of the heating period may be varied to suit the time cycle of particular tubes or conditions. For that purpose each of the cams 68 and 69 is provided with a flanged and slotted bottom 70, 71 through which clamp screws 72, 73 are inserted to clamp the cams in normally fixed positions.

The burners may be caused to travel with the tube receptacles by any suitable means, and a preferred form of the drive means comprises a drive rod 75 that is secured to the rotatable table 24 and extends upwardly therefrom. A bifurcated arm 76, secured to and extending radially from the spider 62, straddles the drive rod 75 and transmits to the spider and burner units pivoted thereto, the rotary motions of the table and its V-block tube-openings as they are propelled about the central stationary shaft 22. The burner cam plate 67 is secured by a set screw 77 to a vertically adjustable sleeve 78 which in turn is clamped in adjusted position on the shaft 22 by a clamp screw 79. The sleeve 78 carries at its upper end a supporting platform 80 for an upper tube-gripper actuating mechanism, which will now be explained.

Each tube receptacle 25, has aligned therewith a gripper mechanism 27 which comprises a pair of pivoted jaw elements 85 and 86 that are mounted in a radially adjustable block member 87 which in turn is carried by a vertically movable gripper arm 88. The gripper jaws 85 and 86 are each pivotally connected to an actuating link 89, which in turn is pivotally connected to one end of a weighted actuating lever 90. The lever 90 is pivoted at 91 to the adjustable block 87, and its inner end extends toward the center of the machine and carries a roller 90a positioned to be actuated by cams 92 and 93 mounted upon the cam support 80 as the grippers revolve.

Each gripper arm 88 is clamped in vertically adjusted position to a gripper raising and lowering rod 94. Each of the rods 94 extends downwardly through the table 24 and carries at its lower end a roller 95 positioned to track upon annular gripper raising and lowering cams 96 and 97 during the rotary movement of the table. The cams 96 and 97 are constructed so that the former overlaps the latter and each is independently angularly adjustable to effect raising and lowering of the gripper at the proper time. Normally the gripper cams are clamped in position to the cover member of the reduction housing 17. The gripper raising cam is formed with a recessed portion 96a that underlies the gripper actuating cam 93. When the gripper lever 90 arrives over the cam 93, the elevating roller 95 drops momentarily into the recess 96a and the rod 94 lowers. When the rod lowers, the gripper arm 88 also lowers and with it the pivot 91 of the lever 90.

The inner end of the lever 90, at this zone in its travel, is left suspended upon the top of the cam 93 and the resulting relative motions effect a lowering of the link 89 and an opening of the jaw members 85 and 86. The waste end of the tube is, by this action of the mechanism, released from the gripper and allowed to fall into a waste bucket or discharge chute (not shown). As the gripper travels away from the waste releasing station just mentioned, the roller 95 rides down the descending portion 97 of the lowering cam, and the gripper is lowered on a tube then positioned in the associated receptacle. When the gripper rod 94 starts to lower, the roller 90a of the weight 90 is aligned with the cam 92 and moves down the inclined side thereof a little late (relative to the descent of the gripper rod 94 and pivot 91) whereby the jaws 85—86 are held open to receive and surround a tube, as explained more fully in my prior Patent #2,379,343.

The gripper, illustrated at the left side of Fig. 1, is down in its lowest position wherein the roller 95 is traveling on a flat portion of its cam track, and the weight 90 is clear of the cam 92. In this position the gripper jaws are closed on a tube to steady the upper end thereof prior to heating. Thereafter the burner flame is increased and the tube begins to heat and soften. At the station shown in the upper left portion of Fig. 3, the tube gripped in that receptacle has become partially soft and the gripper roller 95 is about to engage a small raised portion 98 of the cam 96. On engaging the cam 98 the gripper is elevated and the tube is stretched slightly. After a short interval, the tube is stretched again slightly, by reason of the gripper roller 95 reaching a second shallow step 99 in the cam 96. The successive stretchings effect not only a reduction in tube diameter but a conditioning of the tube for the final cutting off operation. This latter operation occurring at or about the time the gripper elevating roller 95 reaches the incline 96 of the gripper elevating cam. When using the machine for sealing ampules, a good seal may be obtained by omitting the double stretching steps and to that end the cams 98 and 99 preferably are made as a removable piece, as indicated in Fig. 1, capable of attachment to the leading end of the cam 96 by one or more screws 99a. The burner elevating cam 68 is correspondingly formed and positioned (see Fig. 1) to impart a gradual lifting of the flame along the tube axis as the sealing progresses and finally elevates the burner to the out-of-the-way position illustrated at the right side of Fig. 1. The burners are held elevated until the descending portion 69 of the burner cam is reached, which is past the loading station a at the front of the machine.

A fuel gas, which may be gas, gas and air, or gas and oxygen, is supplied to the several burner units through hose connections 100 leading from a distributor 101. The appropriate fuel mixture enters the distributor at the top through a mixer and valves, of conventional type, shown in part in Fig. 1, and is distributed through lateral ports within the distributor in such manner as to increase the burner flame during the tube heating and sealing operation and to decrease the flame on completion of the sealing operation. The sectional view, Fig. 10, illustrates a preferred design of distributor valve porting for this purpose. A distributor similar to the one shown in my Patent #2,379,343 is suitable, and like the prior structure, the distributor of the present machine has an extending arm 102, that connects with the drive rod 75, whereby the outer cone member is rotated in phase relation with the tube receptacles, burners, and grippers. Air, if needed, may be supplied by a pump 105 located in the frame of the machine and coupled to the speed reducing unit 16.

Fig. 8 of the drawings is a plan view of a portion of a sealing machine of the character described, but which is equipped with a variant form of burner assembly. Each of the burner assemblies illustrated in this figure comprises a fuel supply tube 255 that extends outwardly somewhat radially of the rotatable table 24, and carries two extensions 256, each equipped with a burner head 257 and a burner tip 258. The burner tips are positioned opposite each other and preferably slanted to direct the flame toward the unfilled end of the tube, in a manner similar to that illustrated in Fig. 5. The inner end of the burner tube 255 is provided with a stud 263 that is radially adjustable within a bore 263a in a burner arm 261. A clamp screw 265 threaded into the arm 261 provides a means for clamping the burner tube and its tips 258 in proper radial position for a given size tube. The inner end of each burner arm is pivoted, by a screw stud 264 to one of the sides of an octagonal burner block 262. Each of the burner assemblies of the Fig. 8 style carries a roller 266 on its underside that coacts with the burner raising and lowering cams 68 and 69, previously described, to raise and lower the burners in sequence. In other respects the mechanism shown in Fig. 8 corresponds with the mechanism described in reference to Figs. 1–7, and the function and operation of the mechanism is the same.

It will be observed that with either of the cross-fire burner assemblies illustrated in Figs. 3 and 8, the burner tips 58 occupy a fixed position relative to the wall of a tube and for a given tube, wall thickness and flame intensity, the correct relation, once established, remains constant throughout a run. As it is difficult to establish the correct relation beforehand, especially if the size or style of tube to be sealed is changed frequently, the burner tips of each assembly may be made laterally adjustable. Fig. 9 of the drawing illustrates a laterally adjustable cross-fire burner assembly in which each of the burner heads 57a is in the form of an elbow having one leg elongated and interiorly threaded to form a sleeve 57b. The burner tip 58a is threaded to the inside of an exteriorly threaded nipple 58b which is in turn threaded into the sleeve 57b. A check nut 58c is threaded on the nipple and when the proper spacing is obtained, by threading the nipple in or out of the elbow, the check nut is tightened to lock the tip in the required position. This form of adjusting means may be readily applied to the burner heads 57 (Fig. 3) and 257 (Fig. 8) as will be understood, and the proper lateral spacing of the flame relative to the wall of a given tube may be readily obtained.

To operate the machine, the operator starts the main drive motor and engages the drive clutch with the handle 20. The burners are then ignited and the fuel mixture properly adjusted to produce the correct flame. Thereafter the operator places the tubes to be sealed successively in the openings in the carrier as they pass the loading station a. At this station or region, the guide ring 36 is spaced a slight distance away from the rim of the rotating table and tubes may be readily placed in the respective receptacles. As each tube leaves the loading station a, the guide 36a gradually presses on the tube and holds it steady as the related gripper lowers to grip the upper end and the burner assembly moves into operating position. As each burner moves into sealing position its flame is increased and the tube begins to soften. By the time the tube reaches the station shown at the upper left in Fig. 3, the glass has become softened to permit stretching. The tube is gripped near its bottom by pressure of the arm 37, so that when the previously gripped upper end starts to lift away, the tube is not lifted out of the receptacle. The drawing out operation progresses as previously explained and when the tube reaches the position shown at the upper center of Fig. 3 the seal has been completed and the burner flame reduced as well as shifted to an elevated position. The sealed tube continues its travel, being again loosely supported in its receptacle, and reaches the finger 45 whereupon the combined action of the finger, rotation of the carrier 24, and the incline of the notch in the carrier, propel the tube outwardly into the discharge channel 49. Each of the eight sealing units perform as above explained in succession and with a machine constructed for continuous operation as herein explained, it is possible to effect strong and uniform seals at a rate approximately 250 per hour per sealing unit, or 2,000 per hour on a machine equipped with eight units.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claim.

Having thus revealed this invention, I claim as new and desire to secure the following combinations and elements, or equivalents thereof, by Letters Patent of the United States:

A machine for sealing partially filled tubes standing upright comprising means for transporting a tube in upstanding position comprising a movable carrier provided with a vertically disposed V-shaped opening at its outer edge adapted to receive a tube to be sealed, a wall member positioned adjacent the said outer edge of the carrier, said wall member having a surface facing the V-shaped opening at the carrier edge effective to form a side wall thereto, a stationary track member underlying the V-shaped opening in the said carrier to provide an under support for a tube placed in the opening defined by the walls of the V-shaped opening in the carrier and the aforesaid surface of said wall member and along which the tube is caused to travel, said track member extending uninterruptedly from a loading station through a tube delivery station, tube sealing means adjacent the line of travel of the tube operative to heat seal the tube as the latter is moved along said track, said wall member having a delivery portion extending laterally way from the line of travel of the V-opening of the carrier, and finger means arranged in parallel spaced relation to and cooperating with said delivery portion of the wall member and extending into the path of movement of the sealed tube transported in the opening in the carrier operative to intercept the tube and, in cooperation with the trailing wall of the moving V-shaped opening, to effect a shifting of the sealed tube in upstanding position bodily laterally out of the V-shaped opening in the carrier into the channel formed between the delivery portion of the wall member and the face of the said finger means.

FRANK J. COZZOLI.

REFERENCES CITED

The following references are of record in the file of this patent:

UNITED STATES PATENTS

| Number | Name | Date |
| --- | --- | --- |
| 1,844,869 | Hauger et al. | Feb. 9, 1932 |
| 1,862,821 | Henderson | June 14, 1932 |
| 1,962,985 | Dichter | June 12, 1934 |
| 2,258,408 | Cozzoli | Oct. 7, 1941 |
| 2,282,993 | Dichter | May 12, 1942 |

FOREIGN PATENTS

| Number | Country | Date |
| --- | --- | --- |
| 637,943 | Germany | Nov. 6, 1936 |